US006934605B1

(12) United States Patent
Dothan et al.

(10) Patent No.: US 6,934,605 B1
(45) Date of Patent: Aug. 23, 2005

(54) PALLETIZER SYSTEM FOR SELECTIVELY PALLETIZING INDIVIDUAL OR PAIRS OF OBJECTS MOVING ALONG A CONVEYOR

(75) Inventors: Dan Dothan, Tel Aviv (IL); Erez Dothan, Ramat Gan (IL)

(73) Assignee: I-Scan Robotics Ltd., Kadima (IL)

( * ) Notice: Subject to any disclaimer, the term of this patent is extended or adjusted under 35 U.S.C. 154(b) by 0 days.

(21) Appl. No.: 10/117,971

(22) Filed: Apr. 8, 2002

(51) Int. Cl.[7] .................................................. G05B 19/00

(52) U.S. Cl. .................... 700/245; 700/217; 318/568.2; 29/784; 141/6; 901/3; 414/795.7

(58) Field of Search ................................. 700/217, 245; 29/784, 799, 809; 414/795.7, 798, 900, 908; 901/3, 8, 9, 15, 22, 26; 318/568.13, 568.15, 568.18, 568.2

(56) References Cited

U.S. PATENT DOCUMENTS 5,239,739 A * 8/1993 Akeel et al. .................. 29/430
5,272,805 A * 12/1993 Akeel et al. .................. 29/712
5,303,214 A * 4/1994 Kulakowski et al. ...... 369/30.3

OTHER PUBLICATIONS

Zlajpah et al., Implementation of time–optimal path–tracking control on palletizing robots, 1999, IEEE, pp. 861–866.*
Mendelson et al., Behavior–based control of multi–robot assembly/palletizing systems, 2002, IEEE, pp. 1–6.*

* cited by examiner

*Primary Examiner*—Thomas G. Black
*Assistant Examiner*—McDieunel Marc
(74) *Attorney, Agent, or Firm*—Davidson, Davidson & Kappel, LLC

(57) ABSTRACT

A palletizer system is described for transferring a object that are conveyed along a conveyor to a rack, the object having a surface, the palletizer system comprising a camera, a robot transfer subsystem and a control module. The camera is configured to generate images of the object as it is being conveyed along the conveyor. The robot transfer subsystem comprises a gripper module mounted on a robot, the robot being configured to move the gripper module, and the gripper module being configured to controllably grip the surface. The gripper module operates in two modes, including a single-object mode in which it grips one object, and a double-object mode in which it grips two objects concurrently The control module is configured to (i) in response to the images generated by the camera, control the robot to, in turn, move the gripper module adjacent the surface(s) in parallel with the object(s) and with approximately the same speed as the object(s) and the gripper module to grip the surface(s); (ii) control the robot and gripper module to remove the object(s) from the conveyor and transfer them to the rack, and (iii) control the gripper module to release the surface(s), thereby to allow the object(s) to be stacked on the rack.

14 Claims, 4 Drawing Sheets

PALLETIZER SYSTEM FOR SELECTIVELY PALLETIZING INDIVIDUAL OR PAIRS OF OBJECTS MOVING ALONG A CONVEYOR

FIELD OF THE INVENTION

The invention relates generally to the field of palletizer systems for moving, for example, objects of sheet material to, for example, a rack for stacking, prior to the stack being warehoused, packaged for shipment, and the like. More particularly the invention relates to a palletizer system that includes a gripper module that can grip individual objects of sheet material as they are being moved by a conveyor through a pick-up area from which the palletizer system can pick the respective objects up prior to stacking. In addition, the invention relates to a palletizer system configured to operate in a plurality of modes, in one mode the gripper module gripping a single object of sheet material for transfer to the rack and in another mode the gripper module concurrently gripping a plurality of objects of sheet material for transfer either to the same rack or to separate racks. Furthermore, the invention relates to palletizer systems that are adapted to provide flexibility such that the gripper module can accommodate objects of sheet material having wide range of sizes and dimensions.

BACKGROUND OF THE INVENTION

In manufacturing facilities at which sheet material, such as sheets of glass which are referred to as "lites," typically, after manufacturer, individual objects of sheet material are stacked for and may be packaged for transport to a storage facility such as a warehouse, to a customer or the like. Palletizer systems have been developed to facilitate the stacking. Generally, individual objects of the sheet material are provided to a palletizer system by, for example, a conveyor arrangement, which conveys the individual objects to a location from which the palletizer system can grip them. After the palletizer system, or, more specifically, a gripper module mounted on the palletizer system, has gripped a object, it will remove it from the conveyor arrangement and transport it to a rack on which the object is to be stacked. After the palletizer system has moved the object of sheet material to the rack, it will release the object onto the rack, allowing it to be stacked with other objects. After the rack is full, or after a predetermined number of objects have been stacked on the rack, the rack may be removed and replaced with another rack. After the rack has been removed, the stack thereon may be moved to a warehouse for packaging and/or storage, packaged and shipped to a customer, or for other reasons as will be apparent to those skilled in the art.

Several problems arise in connection with palletizer systems such as those described above. In particular, generally, palletizer systems currently require that the conveyors bring a object of sheet material to a stop before they can grip the object and move it to the rack. In addition, typically palletizer systems can only grip a single object of sheet material at a time, which can limit the rate at which the objects can be stacked. Furthermore, typically palletizer systems can only be used to rack objects of limited dimensions and configurations, and it would be desirable be used to provide a palletizer system that can be readily and easily adapted for use in connection with objects having a wide variety of dimensions.

SUMMARY OF THE INVENTION

The invention provides a new and improved palletizer system for moving, for example, objects of sheet material from one location to another, for, for example, stacking on a rack prior to their being warehoused, packaged for shipment, and the like. In connection with one aspect of the invention, the new palletizer system particularly includes a gripper module that can grip the individual objects of sheet material while they are being moved by a conveyor through a pick-up area from which the palletizer system can pick the respective objects up prior to stacking, without the necessity of stopping the respective objects. In connection with another aspect, the palletizer system is configured to operate in a plurality of modes, in one mode the gripper module gripping a single object of sheet material for transfer to the rack and in another mode the gripper module concurrently gripping a plurality of objects of sheet material for transfer either to the same rack or to separate racks. In connection with yet another aspect, the palletizer system is adapted to provide flexibility such that the gripper module can accommodate objects of sheet material having wide range of sizes and dimensions.

In brief summary, the invention provides a palletizer system for transferring a object that are conveyed along a conveyor to a rack, the object having a surface, the palletizer system comprising a camera, a robot transfer subsystem and a control module. The camera is configured to generate images of the object as it is being conveyed along the conveyor. The robot transfer subsystem comprises a gripper module mounted on a robot, the robot being configured to move the gripper module, and the gripper module being configured to controllably grip the surface, the gripper module being configured to operate i. in a double-object mode, in which it is enabled to grip surfaces of a plurality of objects concurrently for transfer to the rack, and, ii. in a single-object mode, in which it is enabled to grip the surface of at most one object concurrently for transfer to the rack The control module is configured to i. in response to an image generated by the camera indicating conveyance of objects along the conveyor, control the robot to, in turn, move the gripper module adjacent the surface in parallel with respective ones of the objects, the number depending on whether the gripper module is to be operated in single-object mode or double object mode, and with approximately the same speed as the respective objects and the gripper module to grip the respective surfaces of the respective objects;

ii. control the robot and gripper module to remove the respective objects from the conveyor and transfer them to the rack, and iii. control the gripper module to release the surface, thereby to allow the respective objects to be stacked on the rack.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
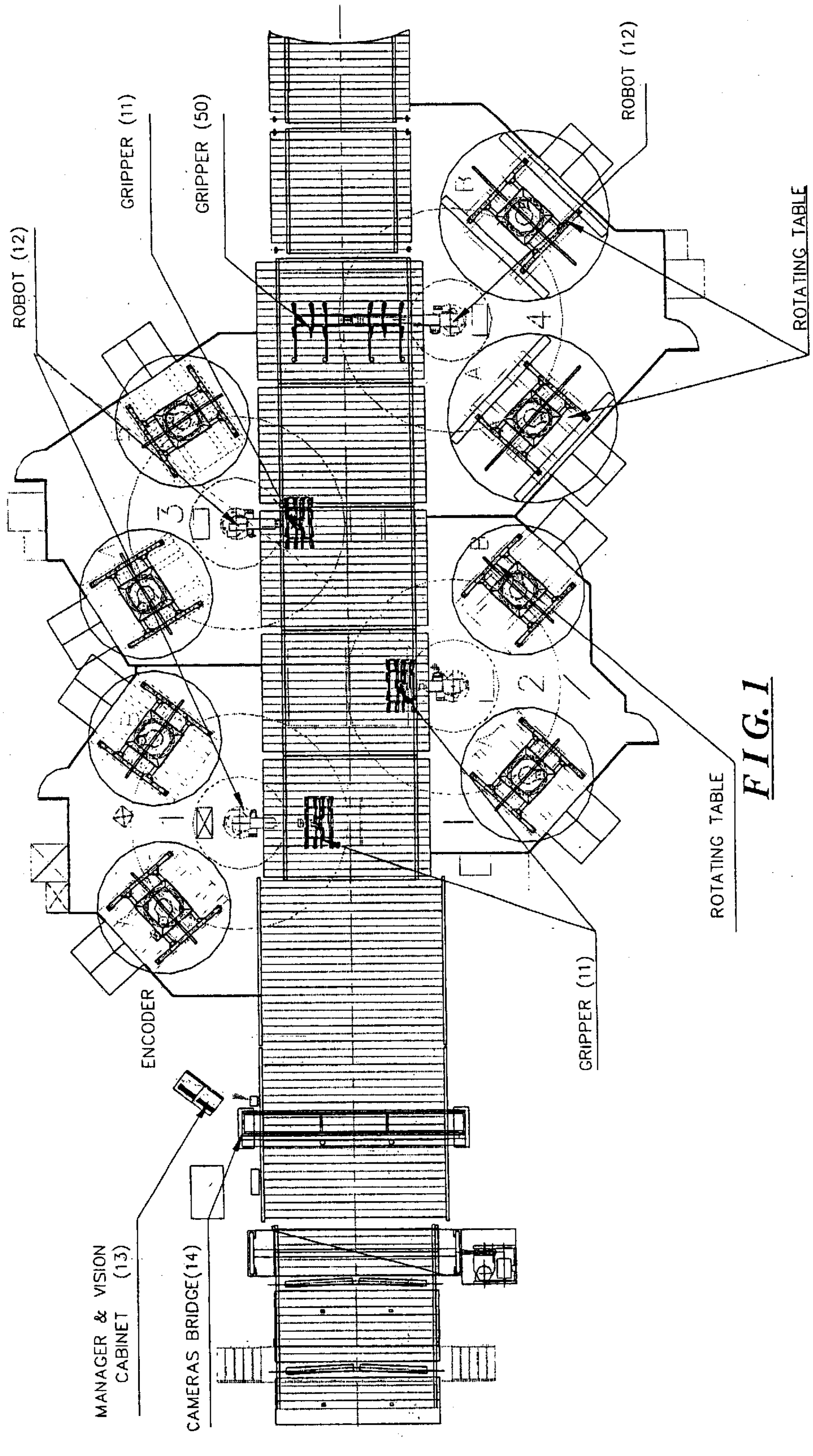
FIG. 1 schematically depicts a palletizer system, including a robot device and associated gripper module, device, constructed in accordance with the invention.

FIG. 1 schematically depicts a palletizer system 10, including one or more robot devices 12 each having a respective gripper module 11, constructed in accordance with the invention. The Each robot device 12 is configured to pick up and transfer individual objects comprising sheet material that are moving through one area, which will be referred to as a pick-up area, to a rack 16 at what will be referred to as a drop-off location, under control of a control module 13 and a CCD (charge-couple device) line camera 14. In one embodiment, the sheet material is in the form of sheets of glass, which are sometimes referred to as "lites," of particular lengths and widths. The lites are initially moved to and through the pick-up area by a conveyor system 15, which moves them generally horizontally from a source toward the pick-up area for the respective robot device 12. The source from which the conveyor system 15 conveys the lites may, for example, be an area in which the lites are manufactured, cut from larger sheets of glass, or the like, as will be apparent to those skilled in the art. As the conveyor system 15 moves the respective lites, they will initially be scanned by the CCD (charge-couple device) line camera 14, which is directed toward the conveyor system 15 to facilitate acquisition of images of lites moving thereover. The CCD line camera 14 provides image information in the form of signals to the control module 13, which, in turn, detects the motion of the lites along the conveyor system 15, in particular detecting the lites' speed along the conveyor system 15 and their respective displacements along the width of the conveyor system 15.

Using the image information provided by the CCD (charge-couple device) line camera 14, the control module 13 can initially determine the condition of each lite, that is, whether the lite is damaged or whether it is in satisfactory condition. If the control module 13 determines that the lite is in satisfactory condition, it will operate to control the robot device 12 so as to move the gripper module 11 horizontally along the conveyor system 15 at approximately the speed and direction at which the conveyor system 15 moves the glass lites, so as to preferably minimize the horizontal speed of the gripper module relative to the horizontal speed of the lite. In addition, using the image information provided by the CCD (charge-couple device) line camera 14, the control module 13 operates to control the robot device 12 so as to position the gripper module 11 at a lateral displacement across the width of the conveyor system 15 corresponding to that of the lite. Finally, and also using the image information provided by the CCD (charge-couple device) line camera 14, the control module 13 can operate to control the robot device 12 so as to orient the length and width of the gripper module 11 to correspond to the length and width of the lite as it is moved over the conveyor system 15. In that case, if the conveyor system 15 is conveying a lite such that its length is oriented along the length of the conveyor system, the control module 13 can enable the robot device 12 to orient the gripper module 11 so that its length is along the conveyor system 15. On the other hand, if the conveyor system 15 is conveying a lite such that its length is at another orientation with respect to the conveyor system 15, such as across the width of the conveyor system 15, the control module 13 can enable the robot device 12 to orient the gripper module 11 so that the length of the gripper module 11 is parallel to the length of the lite.

As the control module 13 controls the robot device 12 as described above, it will also control the gripper module 11 to move vertically downwardly sufficiently to enable it to contact the upper surface of the lite. When the gripper module 11 contacts the lite's surface, the control module 13 enables it, in a manner described below, to firmly grip the upper surface of the lite. After the gripper module 11 has a firm grip on the lite's surface, the control module 13 enables the robot device 12 and gripper module 11 to lift the lite off the conveyor system 15. Thereafter, the robot device 12 and gripper module 11 transfer the lite to the rack 16 at the drop-off location on which the lite will be stacked. In transporting the lite, depending on the location and angular orientation of the rack 16 relative to the pick-up area of the conveyor system 15 from which the robot device 12 and gripper module 11 pick the lite up, the robot device 12 will generally be expected to translate and rotate the lite relative to one or more axes (not shown). After the robot device 12 has moved the lite to the rack 16 at the drop-off location, the robot device 12 will enable the gripper module 11 to release the lite, thereby to allow the lite to rest on the rack 16 provided at the drop-off location. Thereafter, the robot device 12 can return the gripper module 11 to the pick-up area, where it can pick up another lite and repeat the operation.

In one embodiment, the palletizer system 10 may make use of a plurality of racks, each at a respective drop-off location, to which it transfers respective lites. In that case, the palletizer system 10 can, for example, stack a selected number of lites onto one rack, after which it will begin stacking lites onto the other rack. In that embodiment, a plurality of racks are, supported on a rotating table and, when one rack is full, can rotate to provide another rack at the respective drop-off location. While lites are being stacked on the other rack, the first rack can be removed and replaced by another rack. The lites on the rack that was removed can, for example, be removed to a warehouse for storage, packaged for shipment, or for other purposes as will be appreciated by those skilled in the art. These operations can be repeated, with the racks being populated with lites in an alternating manner as described. In addition, multiple rotating tables, each accommodating multiple racks, can be provided at respective drop-off locations proximate the robot device 12, which can be populated with lites from the conveyor system 15. Racks on respective ones of these tables may, for example, be used for lites all of the same size. Alternatively, racks on one table may be used for lites of one size and racks on another table may be used for lites of another size if, for example, lites of various sizes are being conveyed by the conveyor system 15 concurrently. In addition, if, as in the case of the palletizer system 10, a plurality of robot devices 12 are provided, different robot devices 12 may be used with lites of different sizes and dimensions. In that case, different robot devices 12 may be provided with gripper modules having different sizes and dimensions.

As noted above, the control module 13 will generally control the robot device 12 and gripper module 11 to transfer the lite to the rack if it is in satisfactory condition. If the lite is not in satisfactory condition, the control module 13 may also control the robot device 12 and gripper module 11 to transfer the lite to a rack, which may be a different rack that the rack to which lites that are in satisfactory condition are transferred. Alternatively, the palletizer system 10 may allow the conveyor system 15 to transfer lites that are not in satisfactory condition to, for example, a scrap depository area (not shown), typically at the downstream end of the conveyor system 15, where they can be deposited.

One embodiment of gripper module 11 will be described in detail connection with FIGS. 2A 2B. Generally, the gripper module 11 selectively operates in two modes, namely a single-lite mode and a double-lite mode, with the selection of the mode being controlled by the control module 13. When operating in the single-lite mode, the control module 13 will control the robot device 12 and the gripper module 11 to pick up a single lite from the conveyor, transport the lite to the rack, release the lite onto the rack and return the gripper module 11 to the pick-up area at the conveyor to repeat the operation. On the other hand, when operating in the double-lite mode, the control module 13 will control the robot device 12 and the gripper module 11 to pick up two lites from the conveyor, transport both lites to the rack, release the lites onto the rack, and return the gripper module 11 to the pick-up area at the conveyor to repeat the operation. In one embodiment, when operating in the double-lite mode, the gripper module 11 is enabled to drop the lites off individually onto two separate racks; however, it will be appreciated that the gripper module 11 can instead be enabled to drop the lites off side-by-side onto the same rack, or, alternatively, one lite on top of another by suitable movement of the gripper module 11 between the times the gripper module 11 releases each two lite.

Figure 2A:
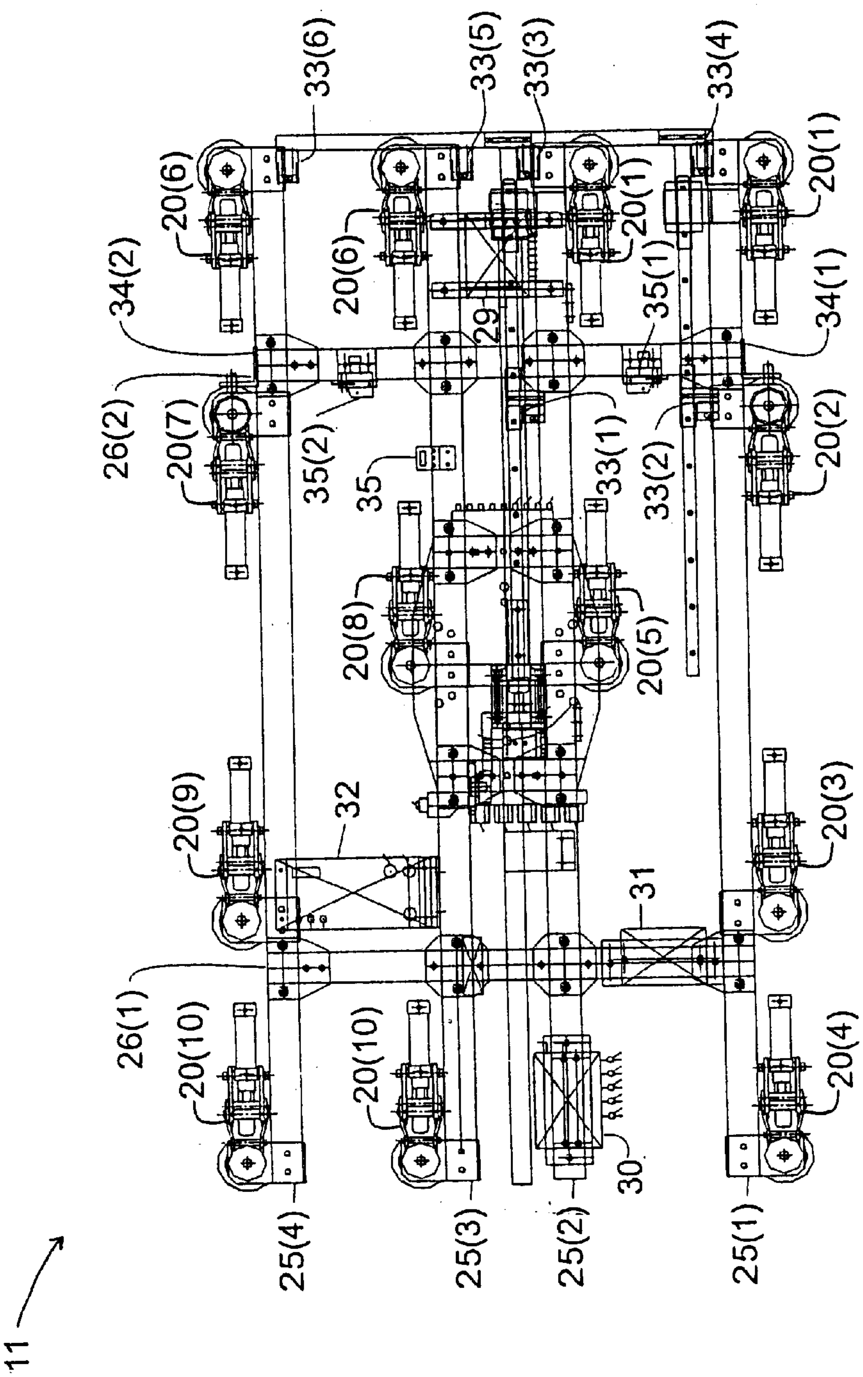
FIGS. 2A and 2B are top and side views, respectively, of one embodiment of the gripper module depicted in FIG. 1.
Figure 2B:
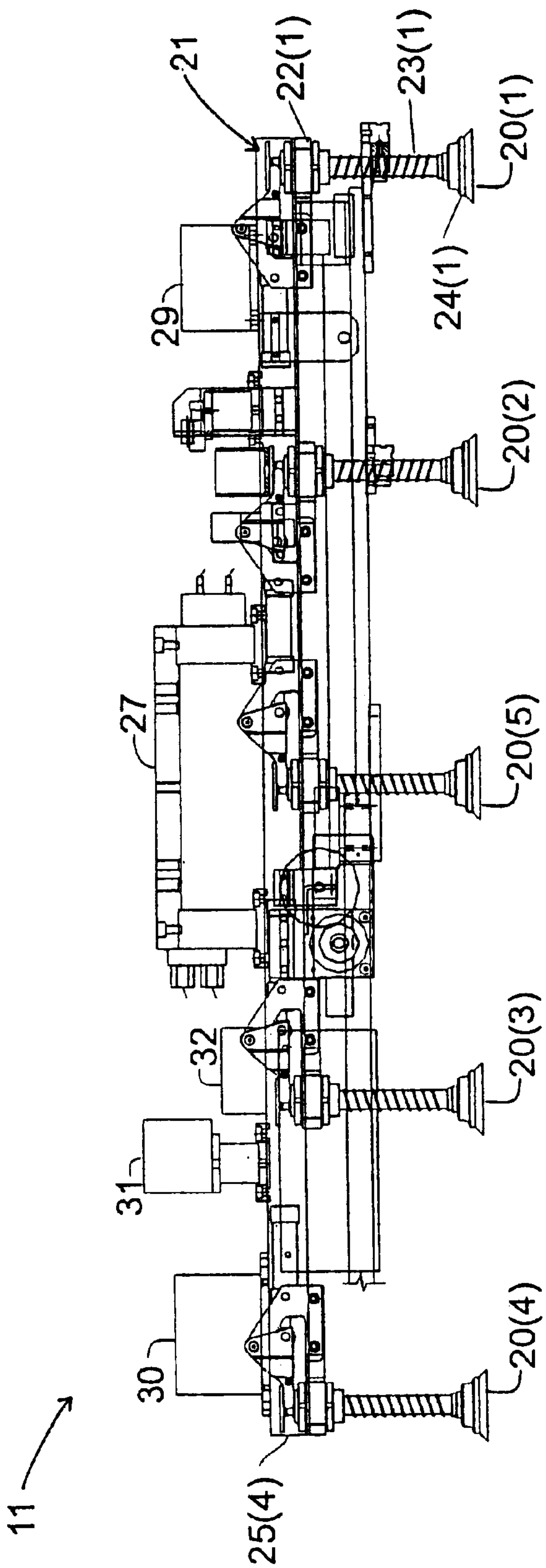

With this background, FIG. 2A is a top view of the gripper module 11 and FIG. 2B is a side view of gripper module 11. With reference to those FIGS., generally, the gripper module 11 includes an array of suction cup assemblies 20(1) through 20(N) (generally identified by reference numeral 20(*n*)), which are arranged in a grid pattern and supported by a support grid 21. In one embodiment, "N" has the value ten (with the proviso that, as shown in FIG. 2A, two suction cup assemblies are labeled with reference numeral 20(1), two are labeled with reference numeral 20(6) and two are labeled with reference numeral 20(10), as will be described below), but it will be appreciated that "N" may have any other convenient value. The elements comprising the support grid 21 have included therein a plurality of manifolds, including a vacuum manifold and a positive air pressure manifold. The vacuum manifold provides a vacuum, or, more specifically, air at a pressure below atmospheric pressure, to the suction cup assemblies 20(*n*). As will be described below, the vacuum will be provided at a pressure sufficiently below atmospheric pressure to enable the gripper module 11 to grip the lite or lites while it lifts it (or them) off the conveyor and transfer(s) it (or them) to the rack at the drop-off location. Similarly, the positive air pressure manifold provides air at a positive air pressure, that is, a pressure above atmospheric pressure, to the suction cup assemblies 20(*n*) for use in releasing the lite(s) when they have reached the rack at the drop-off location. In addition, a third manifold included within the support grid 21 serves to control the suction cup assemblies 20(*n*) as will be described below to enable the gripper module 11 to grip the particular sized lite or lites that are to be transported to the respective rack. The support grid 21 essentially supports the suction cup assemblies 20(*n*) in two sections, one section comprising suction cup assemblies 20(1) through 20(5) and the other section comprising suction cup assemblies 20(6) through 20(10). As will be described below, when operating in single-lite mode, and depending on the width and length of the lites, suction cup assemblies 20(*n*) in both sections may be used during transport of each lite. On the other hand, when operating in double-lite mode, suction cup assemblies within each section will be used for respective lites. That is, when operating in double-lite mode, selected ones of the suction cup assemblies in each section will be used for each lite, the selection being based on the size of the lites, as will be described below.

Each suction cup assembly 20(*n*) includes a piston 22(*n*), a tubular separator 23(*n*) and a suction cup 24(*n*). The piston 22(*n*) in the respective suction cup assembly 22(*n*) operates to extend or retract the respective suction cup 24(*n*). The pistons 22(*n*), tubular separators 23(*n*) and suction cups 24(*n*) of the various suction cup assemblies are preferably dimensioned so that, when they are extended, the suction cups' open ends define a plane, thereby to enable them to grip the generally-planar lite when the palletizer system 10 is moving the lite from the pick-up area to the drop-off location. Each tubular separator 23(*n*) is hollow, and the suction cup 24(*n*) has a hole in alignment and registration with the hollow interior of the tubular separator 23(*n*). For the suction cup assemblies 20(*n*) that the respective pistons 22(*n*) hold in their extended positions, at appropriate times the vacuum manifold will be enabled to be in communication with the tubular separator 23(*n*) thereby to apply a vacuum (that is, reduced air pressure) is applied to the suction cup 24(*n*). When that occurs, and when the suction cup 24(*n*) is in proximity to a lite, the suction cup 24(*n*) will be enabled to adhere to the lite. It will be appreciated that this will occur when the palletizer system 10 is to lift the lite from the pick-up area on the conveyor to move the lite to the rack at the drop-off location. The vacuum manifold is maintained in communication with the tubular separators 23(*n*) until the lite reaches the rack at the drop-off location, thereby to provide a suction that keeps the lite affixed to the suction cups 24(*n*). When the lite reaches the rack, the positive air pressure manifold will be enabled to be in communication with the tubular separators 23(*n*) and suction cups 24(*n*) thereby to apply the positive air pressure from that manifold to the respective tubular separator 23(*n*) and suction cup 24(*n*) which will enable the suction cup 24(*n*) to quickly release the lite onto the rack.

Finally, there are some situations in which neither the vacuum manifold nor the positive air pressure manifold will be in communication with the tubular separator 23(*n*) or suction cup 24(*n*). For example, when the robot device 12 is returning the gripper module 11 from the rack at the drop-off location to the pick-up area of the conveyor, it will be preferable to ensure that the tubular separator 23(*n*) and suction cup 24(*n*) are not in communication with either the vacuum manifold or the positive air pressure manifold. In addition, as will be described below, the gripper module 11 can be used with lites of different dimensions, and depending on the dimensions of the particular lites with which the palletizer system 10 is being used at any point in time, respective tubular separators 23(*n*) and suction cups 24(*n*) of selected subsets of the suction cup assemblies 20(*n*) will be enabled to be in communication with the vacuum and positive air pressure manifolds as described above when the gripper module 11(*n*) is used to grip the lite when transporting it between the pick-up area and the drop-off location.

As noted above, the suction cup assemblies 20(*n*) are mounted on a support grid 21. The support grid 21 comprises a plurality of members arranged in a selected pattern. In the embodiment described in connection with FIGS. 2A and 2B, the members include a plurality of members 25(1) through 25(H) (generally identified by reference numeral 25(*h*)) that are arranged horizontally as depicted in FIG. 2A, and members 26(1) through 26(V) (generally identified by reference numeral 26(*v*)) that are arranged vertically. In one embodiment, "H" is four, and "V" is two. The vertical members 26(*v*) effectively operate as separators for the horizontal members 25(*h*). Essentially, members 25(1) and 25(2) support suction cup assemblies 20(1) through 20(5) comprising one section, and members 25(4) and 25(3)

support suction cup assemblies 20(6) through 20(10) comprising the other section. The various manifolds as described above reside interiorly of the grid members 25(*h*) and 26(*v*), and distribute the vacuum, positive air pressure and piston operating pressure to the various suction cup assemblies 20(*n*) as described above. In addition, the support grid 21 is provided with an attachment plate 27 that can be used to attach the gripper module 11 to the robot 12. Valves 30 and 31 selectively connect the respective vacuum and positive air pressure manifolds to sources of vacuum and positive air pressure. A multi-way piston valve 29 is provided to control the pistons 22(*n*) of the various suction cup assemblies 20(*n*) in a conventional manner. The valves 29 through 31 are controlled by signals generated by the robot device 12 and provided to the respective valves 29 through 31 through a devicenet module 32.

Also mounted on the support grid 21 are a plurality of edge sensors 33(1) through 33(E) (generally identified by reference numeral 33(*e*)) that generate signals that are used in a conventional manner by the robot device 12 to control the positioning of the lite when the lite is released on the rack.

In addition, also mounted on the support grid 21 are a plurality of collision detectors 34(1) through 34(D) (generally identified by reference numeral 34(*d*)). In the embodiment disclosed herein, two collision detectors 34(*d*) are provided, mounted on the support grid proximate opposite ends of the members 26(V) of the support grid 21. The collision detectors 34(*d*) generate signals that indicate whether the gripper module 11 is approaching another object with which it may collide. The signals from the collision detectors 34(*d*) are provided to the robot device 12 and are used by it in controlling its movement.

Further, the gripper module 11 includes a plurality of vacuum sensors 35 and vacuum sensors 35(1) through 35(2) (generally identified by reference numeral 35(*v*)), for sensing the level of vacuum inside the vacuum manifold and generating a signal representative thereof. Vacuum sensor 35 senses the vacuum level within the vacuum manifold in both sections, and each vacuum sensor 35(*v*) senses the vacuum level within the portion of the vacuum manifold that is associated with each of the respective sections. The robot device 12 uses the signals from the vacuum sensors 35 and 35(*v*) to determine, when the gripper module 11 is to grip a lite, the vacuum level is such that the lite will remain attached to the gripper module while it is being transported to the rack.

As noted above, the robot device 12, under control of the control module 13, controls pistons 22(*n*) of selected ones of the suction cup assemblies 20(*n*) in particular patterns to enable the suction cup assemblies to grip a lite and thereafter release it, the selection being based on the length and width dimensions of the lite. In addition, the robot device 12 can control the pistons 22(*n*) of suction cup assemblies 20(*n*) in particular patterns to facilitate transfer of a plurality of lites at one time when the gripper module 11 is operating in double-lite mode.

In particular, in one embodiment, if the gripper module 11 is to transport a single lite, when operating in single-lite mode, the robot device 12 controls pistons 22(*n*) of suction cup assemblies 20(*n*) in the following patterns:

| Pattern ID | Suction cup assemblies |
|---|---|
| A | 20(2), 20(3), 20(5) |
| B | 20(2), 20(3), 20(5), 20(8) |
| C | 20(2), 20(3), 20(5), 20(7), 20(8), 20(9) |
| D | 20(1), 20(2), 20(3), 20(4), 20(5) |
| E | 20(1), 20(2), 20(3), 20(4), 20(5), 20(8) |
| F | 20(1), 20(2), 20(3), 20(4), 20(5), 20(6), 20(7), 20(8) 20(9), 20(10) |

Pattern group comprising patterns A through C, on the one hand, and pattern group D through F, on the other hand, are used in connection with lites in two different ranges of lengths, with pattern group A through C being used in connection with lites that are shorter than a predetermined length, and pattern group D through F being used in connection with lites that are longer than the predetermined length. In particular it will be appreciated that the patterns in pattern group D through F will be used in connection with lites whose length is at least as large as the distance between suction cup assemblies 20(4), 20(10), on the one hand, and suction cup assemblies 20(1), 20(6), on the other hand.

Within each pattern group, the different patterns are used with lites of different widths. For example, the suction cup assemblies 20(*n*) used in connection with patterns A and D will both be used in connection with lites of the same range of widths, although assemblies 20(*n*) that are used in connection with pattern A will be used with lites of different length ranges. It will be apparent from FIG. 2A that the suction cup assemblies 20(*n*) that are selected for use in each pattern define a plane. That is, both patterns A and D make use of suction cup assemblies 20(2) and 20(3) along support grid member 25(1), which together define a line, and in addition make use of suction cup assembly 20(5) along support grid member 25(2), which, along with the suction cup assemblies 20(2) and 20(3) along the line defined by the support grid member 25(1), defines a plane. Pattern D additionally makes use of suction cup assemblies 20(4) and 20(1) along support grid member 25(1) and suction cup assembly 20(1) along support grid member 25(2) which can serve to provide additional support for the longer lites with which the pattern D is used. Similarly with the other pairs of patterns B, E and C, F.

On the other hand, if the gripper module 11 is to transport a two lites, in double-lite mode, the robot device 12 controls pistons 22(*n*) of suction cup assemblies 20(*n*) in the following patterns:

| Pattern ID | Suction cup assemblies | |
|---|---|---|
| | Lite A | Lite B |
| G | 20(1), 20(2) | 20(6), 20(7) |
| H | 20(1), 20(2), 20(5) | 20(6), 20(7), 20(8) |
| I | 20(1), 20(2), 20(3), 20(5) | 20(6), 20(7), 20(8), 20(9) |
| J | 20(1), 20(2), 20(3), 20(4), 20(5) | 20(6), 20(7), 20(8), 20(9), 20(10) |

Lites A and B will be arrayed on the conveyor in parallel, with the lite A being generally conveyed so as to be proximate ones of the suction cup assemblies 20(1), 20(2), 20(3), 20(4), and/or 20(5), and lite B being generally conveyed so as to be proximate ones of the suction cup assemblies 20(6), 20(7), 20(8), 20(9), and/or 20(10).

It will be appreciated that, in contrast with single-lite mode, during which the suction cup assemblies generally symmetrically disposed about a vertical axis that vertically bisects the gripper module 11, as shown in FIG. 2A, are used, the suction cup assemblies generally starting from along one edge, in particular the right edge as shown in FIG. 2A will be used when the gripper module 11 is operating in double-lite mode. As is apparent from the above discussion, when the gripper module 11 is operating in single-lite mode, as lites become longer, the suction cup modules along the left and right edges (as shown in FIG. 2A) will be used, and as lites become wider, suction cup modules from the lower edge towards the upper edge (as also shown in FIG. 2A) will be used. On the other hand, when the gripper module 11 is operating in double-lite mode, as the lites become longer, suction cup modules from the right edge towards the left edge (as shown in FIG. 2A) of the gripper module 11 will be used.

In operation, when operating in single-lite mode, the control module 13, receives images from the CCD (charge-couple device) line camera 14 of the conveyor system 15 to monitor the passage of lites there along. After the line camera 14 detects a lite passing along the conveyor system 15, the control module 13 determines whether the lite is in satisfactory condition. In that operation, in addition to verifying that the edges of the lite are straight and the corners are angled appropriately, the control module 13 determines the size of the lite from the image provided thereto by the CCD (charge-couple device) line camera 14 and will compare the size to previously-provided size information to verify that the lite is of the appropriate size. In addition, the control module 13 will determine the lite's position, speed, direction of travel and orientation of travel along the conveyor system 15, and select one of the robot devices 12 that is to transfer the lite from the conveyor system 15 to the respective rack. The control module 13 will enable the robot device 12 to, in turn, position its respective gripper module 11 proximate the lite and enable it (that is, the gripper module 11) to move along the conveyor at approximately the same speed as the lite. In addition, if the appropriate ones of the suction cup assemblies 20(*n*), as determined by the size of the lite, are not in their extended positions, the robot device 12 will control the pistons 22(*n*) of the appropriate suction cup assemblies 20(*n*) to extend the appropriate ones of the suction cup assemblies 20(*n*) and the pistons of the other suction cup assemblies retract those suction cup assemblies.

The robot device 12 lowers the gripper module 11 so that the suction cups 24(*n*) of the extended suction cup assemblies contact the upper surface of the lite and operate the appropriate manifold valves 29 and 30, depending on the length and width of the lite, to enable them to enable the vacuum manifold to communicate with the respective tubular separators 23(*n*) and suction cups 24(*n*) thereby to enable the gripper module 11 to grip the lite. The robot device 12 monitors the signals from the vacuum sensors 35(*v*), and, when the signals indicate that the vacuum has reached a level sufficient to allow the gripper module 11 to lift the lite and transfer it to the rack at the drop-off location, it will lift the gripper module 11 and lite, and move the lite to the rack at the drop-off location. When the gripper module 11 and lite have reached the rack, the robot device 12 will control the manifold valve 31 to enable it to enable the positive air pressure manifold to communicate with the respective tubular separators 23(*n*) and suction cups 24(*n*) thereby to enable the gripper module 11 to release the lite onto the rack. Thereafter, the robot device 12 returns the gripper module 11 to the conveyor system 15 to repeat the cycle.

Similar operations occur when operating in double-lite mode, except that the control module 13 commands the robot device 12 to operate the gripper module 11 to grip two lites concurrently.

Figure 3:
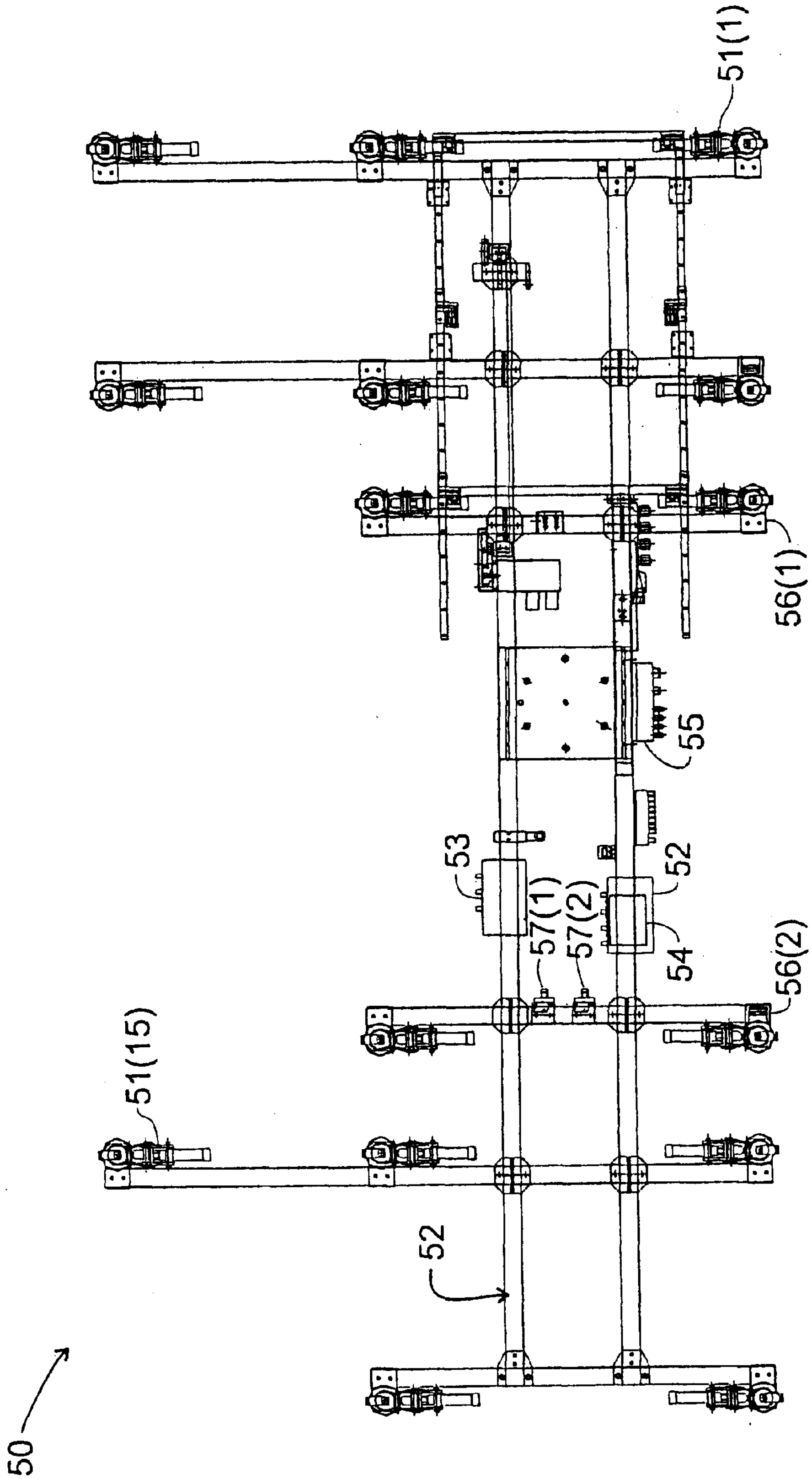
FIG. 3 is a top view of a second embodiment of the gripper module depicted in FIG. 1.

FIG. 3 depicts a top view of a second embodiment of the gripper module, identified by reference numeral 50. As with gripper module 11 described above in connection with FIGS. 2A and 2*b*, gripper module 50 comprises a plurality of suction cup assemblies 51(*m*) arrayed in a grid pattern by a support. grid 52. The support grid 52 provides manifolds, interior of the support grid, similar to those described above in connection with FIGS. 2A and 2B. The suction cup assemblies 51(*m*) include pistons, tubular separators and suction cups (not separately shown) similar to those described above in connection with suction cup assemblies 20(*n*). In addition, the gripper module 50 includes manifold valves 53, 54 and 55 that operate in a manner similar to manifold valves 29–31 described above. The gripper module 50 also includes collision sensors 56(*c*) and edge sensors 57(*e*) mounted on the support grid 52 in a manner similar to that described above.

Generally, the gripper module 50 will be used in a manner similar to that described above in connection with gripper module 11, except that gripper module 50 is only used in single-lite mode. The pattern of suction cup modules 51(*m*) that are used for a particular sized lite will be based on the length and width of the particular lite that the gripper module 50 is gripping at any point in time.

The invention provides a number of advantages. In particular, the invention provides a gripper module for use in connection with a robot that can be used to grip sheet material of a variety of sizes and dimensions that are in motion, to facilitate moving or transporting of the sheet material from a pick-up area, such as a conveyor, to a drop-off location, such as a rack.

It will be appreciated that a number of changes and modifications may be made to the gripper module as described herein. For example, the suction cup assemblies 20(*n*) may be arrayed in patterns other than the particular patterns depicted herein.

In addition, although the gripper module has been described as being for use in connection with sheet material such as, but not limited to, glass lites, it will be appreciated that the gripper module may be used in connection with other elements, provided the elements have preferably generally planar surfaces that can be gripped by the respective gripper module.

The foregoing description has been limited to a specific embodiment of this invention. It will be apparent however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A palletizer system for transferring objects that are conveyed along a conveyor to a rack, each object having a surface, the palletizer system comprising:

A. a camera configured to generate images of the object as it is being conveyed along the conveyor;

B. a robot transfer subsystem comprising a gripper module mounted on a robot, the robot being configured to move the gripper module, and the gripper module being configured to controllably grip the surface, the gripper module being configured to operate in i. in a double-object mode, in which it is enabled to grip surfaces of a plurality of objects concurrently for transfer to the rack, and, ii. in a single-object mode, in which it is enabled to grip the surface of at most one object concurrently for transfer to the rack; and C. a control module configured to i. in response to an image generated by the camera indicating conveyance of objects along the conveyor, control the robot to, in turn, move the gripper module adjacent the surface in parallel with respective ones of the objects, the number depending on whether the gripper module is to be operated in single-object mode or double object mode, and with approximately the same speed as the respective objects and the gripper module to grip the respective surfaces of the respective objects;

ii. control the robot and gripper module to remove the respective objects from the conveyor and transfer them to the rack, and iii. control the gripper module to release the surface, thereby to allow the respective objects to be stacked on the rack.

2. A palletizer system as defined in claim 1 in which the control module is further configured to, after the gripper module has released the respective objects, control the robot device to transfer the gripper module to a position proximate the conveyor, thereby to be in a position to facilitate transfer of another object to the rack.

3. A palletizer system as defined in claim 1 in which the camera is a CCD (charge-coupled device) line camera configured to generate a series of images.

4. A palletizer system as defined in claim 1 in which the control module is further configured to use the images generated by the camera to determine conditions for the respective objects, the control device conditioning its control of the robot and gripper module in response to the conditions of the respective objects.

5. A palletizer system as defined in claim 1 in which the gripper module comprises a plurality of suction cup assemblies mounted on a grid support in a selected grid pattern, each suction cup assembly being configured to, under control of the control module, selectively apply a suction to the surface, thereby to enable the suction cup assembly to grip the surface.

6. A palletizer system as defined in claim 5 in which each suction cup assembly includes a suction cup, a piston and a separator configured to separate the suction cup from the piston by a selected distance, the piston being configured to, under control of the control module, selectively extend or retract the suction cup, the suction cup when extended being in position to apply a suction to the surface.

7. A palletizer system as defined in claim 6 in which, each suction cup assembly is further configured to, under control of the control module, selectively apply an enhanced air pressure to the separator and suction cup thereby to facilitate release of the surface by the suction cup.

8. A palletizer as defined in claim 7 in which the surface has a selected form and the separators of the respective suction cup assemblies have respective lengths so that the suction cups generally conform to the selected form.

9. A palletizer as defined in claim 8 in which the selected form is planar.

10. A palletizer system as defined in claim 8 in which the surface has a size configuration and the control module is configured to select a pattern of suction cup assemblies that are to apply suction to the surface based on the surface's size configuration.

11. A palletizer system as defined in claim 10 in which the control module is configured to determine the size configuration from the images provided by the camera.

12. A palletizer system as defined in claim 10 in which the control module is configured to determine the size configuration from size information previously-provided thereto.

13. A palletizer system as defined in claim 5 in which each suction cup assembly is further configured to, under control of the control module, selectively apply an enhanced air pressure to the surface, thereby to facilitate rapid release of the surface by the suction cup assembly.

14. A palletizer system as defined in claim 5 in which the suction cup assemblies are organized into two sections, the control module being configured to, A. when the gripper module is operating in double-object mode, enable selected ones of the suction cup assemblies in each of the two sections to grip surfaces of respective objects, and, B. when the gripper module is operating in single-object mode, enable selected ones of the suction cup assemblies in one or both sections, depending on the size of the surface, to grip the surface.

* * * * *